United States Patent [19]
Davitt et al.

[11] 4,321,182
[45] Mar. 23, 1982

[54] STABLE NON-CORROSIVE SOLUTION OF POLYBENZIMIDAZOLE SUITABLE FOR USE IN THE FORMATION OF SHAPED ARTICLES

[75] Inventors: Robert Davitt, Bergen; Gordon W. Calundann; Edward C. Chenevey, both of N. Plainfield, all of N.J.

[73] Assignee: Celanese Corporation, New York, N.Y.

[21] Appl. No.: 260,652

[22] Filed: May 4, 1981

[51] Int. Cl.$^3$ .................... C08K 5/34; C08K 5/36; C08K 5/17
[52] U.S. Cl. .................... 524/233; 524/234; 524/394; 524/104; 524/166; 524/173
[58] Field of Search ............... 260/30.8 DS, 326 NT, 260/30.2

[56] References Cited
U.S. PATENT DOCUMENTS 3,502,606  3/1970  Conciatore et al. ............... 260/32.6
3,763,107  10/1973  D'Alelio ............................ 260/72.5
3,836,500  9/1974  Calundann et al. ............. 260/32.6 N Primary Examiner—Joseph L. Schofer
Assistant Examiner—Bernard Lipman
Attorney, Agent, or Firm—Charles B. Barris

[57] ABSTRACT

An improved solution of a polybenzimidazole suitable for use in the formation of shaped articles (e.g. fibers, films, and the like) is provided which includes a minor amount of an organo-lithium compound (as defined) which has been found to be capable of inhibiting the separation of the solution into phases of greater and lesser concentrations of the polybenzimidazole upon the passage of time. In a preferred embodiment the organo-lithium compound is lithium stearate. Not only is stability imparted to the solution prior to the formation of a shaped article, but the potential for catastrophic corrosive stress cracking of stainless steel equipment in contact with the solution is eliminated such as that which may occur following the extended use of the common prior art additive, lithium chloride.

38 Claims, No Drawings

STABLE NON-CORROSIVE SOLUTION OF POLYBENZIMIDAZOLE SUITABLE FOR USE IN THE FORMATION OF SHAPED ARTICLES

BACKGROUND OF THE INVENTION

It is recognized that polybenzimidazoles and particularly aromatic polybenzimidazoles are characterized by a high degree of thermal stability. They may be shaped to form fibers, films and other articles of wide utility which show great resistance to degradation by heat, hydrolytic and oxidizing media.

It has been further recognized that solutions of polybenzimidazoles in an organic solvent suitable for extrusion into shaped articles often cannot be stored much more than one to three days without a "phasing out" phenomenon occurring, i.e. a separation of the solution into two phases containing larger and smaller concentrations of polymer. The exact time of the onset of such phase out is unpredictable. This phased out solution is completely unsuitable for extrusion into shaped articles and interferes with routine storage of the polymer solution in an extrusion plant. While the phased out solution can generally be transformed into a homogeneous solution by means of additional mixing procedures, this results in additional expense and inconvenience.

Commonly assigned U.S. Pat. No. 3,502,606 to Anthony B. Conciatori and Charles L. Smart discloses that this undesirable phase separation can be prevented if one incorporates a minor amount of certain additives in the solution of the polybenzimidazole. It is there contemplated that the additive be lithium chloride, zinc chloride, N-methyl morpholine, triethylamine, or triethanol amine. Heretofore lithium chloride has been the additive of choice because of its effectiveness in solving the phase separation phenomenon.

However, it is well known that extended contact of stainless steel equipment (e.g. of common 300 series stainless steel) with halides (e.g., chlorides) has the tendency to lead to the catastrophic stress cracking of the stainless steel. For instance, it is common that various vessels for forming polymer solutions and pressure lines for the same be formed of such stainless steel. The onset of stress cracking can come without warning and necessitates a time consuming periodic visual inspection of the equipment. Should such stress cracks be observed additional replacement costs must be incurred as well as costly down time for the plant. Alternatively, if such procedures are to be eliminated the equipment heretofore must originally be constructed of more expensive alloys which are not as susceptible to corrosive stress cracking. This approach would lead to a significantly greater capital expenditure for a commercial plant.

It is an object of the present invention to provide a stable solution of a polybenzimidazole suitable for use in the formation of shaped articles which does not rely on the inclusion of a lithium chloride additive as is common in the prior art.

It is an object of the present invention to provide a highly stable solution of a polybenzimidazole suitable for use in the formation of shaped articles wherein the additive employed has no known propensity to promote corrosive stress cracks when contacted with common forms of stainless steel for extended periods of time.

It is an object of the present invention to provide a highly stable solution of a polybenzimidazole which is non-corrosive to common 300 series stainless steel thereby making possible significant capital savings during the construction and operation of a plant in which such solution is handled.

It is another object of the present invention to provide a process for forming shaped polybenzimidazole articles (e.g. fibers, films, etc.) wherein neither phase out of the polymer solution involved nor the potential for corrosive attack of the equipment employed need be considered.

It is a further object of the present invention to provide a process which is capable of forming polybenzimidazole fibers and films of unusually high surface area.

These and other objects, as well as the scope, nature, and utilization of the invention will be apparent to those skilled in the art from the following detailed description and appended claims.

SUMMARY OF THE INVENTION

It has been found that a stable non-corrosive solution suitable for the formation of shaped polybenzimidazole articles comprises:

(a) a solvent capable of dissolving the polybenzimidazole which is selected from the group consisting of N,N-dimethylacetamide, N,N-dimethylformamide, dimethylsulfoxide, and N-methyl-2-pyrrolidone, (b) a polybenzimidazole dissolved in the solvent, and (c) a minor amount of an organo-lithium compound dissolved in the solvent which is non-corrosive and is capable of inhibiting the separation of the solution into phases of greater and lesser concentrations of the polybenzimidazole upon the passage of time with the organo-lithium compound being selected from the group consisting of $RCO_2Li$, $RSO_3Li$, $ROSO_3Li$, and mixtures of any two or all three of the foregoing, wherein R is a hydrocarbon radical having 1 to 50 carbon atoms.

It has been found that an improved process for forming shaped polybenzimidazole articles comprises:

(a) dissolving a polybenzimidazole and a minor amount of an organo-lithium compound selected from the group consisting of $RCO_2Li$, $RSO_3Li$, $ROSO_3Li$, and mixtures of any two or all three of the foregoing wherein R is a hydrocarbon radical having 1 to 50 carbon atoms, in a solvent selected from the group consisting of N,N-dimethylacetamide, N,N-dimethylformamide, dimethylsulfoxide, and N-methyl-2-pyrrolidone, (b) storing the resulting solution in contact with stainless steel for a period of at least one day without the occurrence of substantial phase separation in the same or corrosive damage to the stainless steel, and (c) extruding the solution through an opening to form a shaped article.

DESCRIPTION OF PREFERRED EMBODIMENTS

The polymeric material utilized in the present process is a linear polybenzimidazole. Typical polymers of this class and their preparation are more fully described in U.S. Pat. No. 2,895,948, U.S. Pat. No. Re. 26,065, and in the Journal of Polymer Science, Vol. 50, pages 511–539 (1961) which are herein incorporated by reference. The polybenzimidazoles consist essentially of recurring units of the following Formulas I and II.

Formula I is:

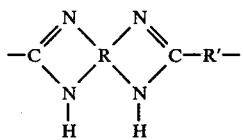

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

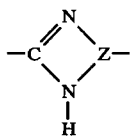

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene, and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2-2'-(furylene-2",5")-5,5'-bibenzimidazole;
poly-2,2'-(naphthalene-1",6")-5,5'-bibenzimidazole;
poly-2,2'-(biphenylene-4"4'")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5',5"-di(benzimidazole)propane-2,2; and
poly-2,2'-(m-phenylene)-5',5"-di(benzimidazole)ethylene-1,2
where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

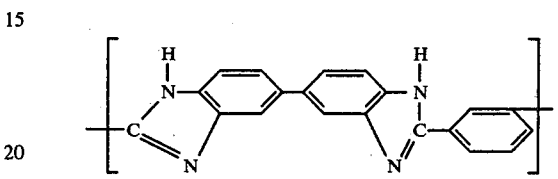

Any polymerization process known to those skilled in the art may be employed to prepare the polybenzimidazole which is utilized in the present invention. Representative techniques for preparing the polybenzimidazole are disclosed in U.S. Pat. Nos. 3,509,108; 3,549,603; and 3,551,389, which are assigned to the assignee of the present invention and are herein incorporated by reference.

With respect to aromatic polybenzimidazoles, preferably, equimolar quantities of the monomeric tetraamine and dicarboxyl compound may be introduced into a first stage melt polymerization reaction zone and heated therein at a temperature above about 200° C., preferably at least 250° C., and more preferably from about 270° to 300° C. The reaction is conducted in a substantially oxygen-free atmosphere, i.e., below about 20 p.p.m. oxygen, until a foamed prepolymer is formed having an inherent viscosity, expressed as deciliters per gram, of at least 0.1, and preferably from about 0.13 to 0.3 (determined from a solution of 0.4 grams of the polymer in 100 ml. of 97 percent $H_2SO_4$ at 25° C.).

After the conclusion of the first stage reaction, which normally takes at least 0.5 hour, and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more.

Suitable organic solvents for forming the stable non-corrosive solution of the present invention are those commonly used for dissolving a polybenzimidazole and are N,N-dimethylacetamide, N,N-dimethylformamide, dimethylsulfoxide, and N-methyl-2-pyrrolidone. The particularly preferred solvent is N,N-dimethylacetamide.

The key to the present invention is the finding that a minor amount of an organo-lithium compound as defined hereafter when dissolved in the polybenzimidazole solution will inhibit the usual separation of the solution into phases of greater and lesser concentration of the polybenzimidazole upon the passage of time. This is accomplished without the promotion of corrosive stress cracking in stainless steel which contacts the same. The organo-lithium compound is selected from the group consisting of $RCO_2Li$, $RSO_3Li$, $ROSO_3Li$, and mixtures of any two or all three of the foregoing wherein R is a hydrocarbon radical having 1 to 50 carbon atoms. Representative lithium salts of monocarboxylic acids are lithium formates, lithium acetate, lithium propionate, lithium butyrate, lithium isobutyrate, lithium valerate, lithium isovalerate, lithium caproate, lithium laurate, lithium cetylate, lithium stearate, etc. Representative lithium hydrocarbon sulfonates are lithium lauryl sulfonate, lithium cetyl sulfonate, etc. Representative lithium hydrocarbon sulfates are lithium lauryl sulfate, lithium cetyl sulfate, etc. The particularly preferred organo-lithium compound is lithium stearate. The organo-lithium compound may be dissolved in the solvent in a concentration of approximately 0.5 to 10 percent by weight based upon the weight of the solvent, and preferably in a concentration of approximately 2 to 5 percent (e.g. 2 percent) by weight based upon the weight of the solvent. In a preferred embodiment the organo-lithium compound is dissolved in the solvent prior to the dissolution of the polybenzimidazole in the same.

The polybenzimidazole commonly is dissolved in the solvent in a concentration of approximately 10 to 30 percent by weight based upon the total weight of the solution, and preferably in a concentration of approximately 20 to 26 percent by weight when used in the formation of fibers.

A preferred fiber spinning solution employs N,N-dimethylacetamide as solvent and comprises approximately 24 percent by weight of poly-2,2'-m-phenylene-5,5'-bibenzimidazole based upon the total weight of the solution, and approximately 2 percent by weight of lithium stearate based upon the weight of N,N-dimethylacetamide.

The spinning solution preferably exhibits a viscosity of about 40 to 4000 poises measured at 30° C., and most preferably a viscosity of about 1200 to 2500 poises measured at 30° C.

One suitable means for dissolving the polymer in the solvent is by mixing the materials at a temperature above the normal boiling point of the solvent for example, about 25° to 120° C. above such boiling point, and at a pressure of 2 to 15 atmospheres for a period of 1 to 5 hours. The resulting solutions then preferably are filtered to remove any undissolved polymer.

The polybenzimidazole solutions in accordance with the present invention contain no additives such as lithium chloride which may have an adverse influence on stainless steel following prolonged contact. Additionally, no phase out problem is encountered should the solution be stored following its formation and prior to extrusion to form a shaped article. For instance, the solution may be stored at least one day without phase separation, and preferably at least three days or more without phase separation. As indicated in the Examples, the solution may reliably remain stable many months in some embodiments.

Shaped articles (e.g., fibers or films) may be formed from the polybenzimidazole solution of the present invention via standard extrusion techniques which are known in the art. For instance, the solution may pass through an orifice and into an evaporative or coagulative medium to form a shaped article. Representative techniques for forming shaped articles from the solution are disclosed in commonly assigned U.S. Pat. Nos. 3,441,640; 3,502,756; 3,526,693; 3,584,104; and 3,619,453; and U.S. Pat. No. 32,422, filed Apr. 23, 1979 (now U.S. Pat. No. 4,263,245, granted Apr. 21, 1981). Such shaped articles may be washed and drawn in accordance with the teachings of commonly assigned U.S. Pat. Nos. 3,541,199; 3,622,660; 3,657,411; 3,723,592; 3,743,479; 3,814,794; 3,816,581; 3,836,621; and 3,848,529. Each of the above disclosures is herein incorporated by reference. Alternatively, films or membranes may be cast from the solution of the present invention.

It has been found that filaments and membranes formed from the polybenzimidazole solution of the present invention following drawing and washing commonly possess a distinctive microporous internal structure. Such structure does not, however, result in any substantial reduction in tensile properties. Additionally, the resulting filaments commonly possess a delustered appearance and a substantially increased surface area (e.g. a four fold increase in surface area). It is expected that these surface characteristics may better facilitate dyeing of the same under appropriate conditions.

The following examples are presented as specific illustrations of the claimed invention. It should be understood, however, that the invention is not limited to the specific details set forth in the examples.

EXAMPLE I

The polybenzimidazole selected was 2,2'-m-phenylene-5,5'-bibenzimidazole having an inherent viscosity of approximately 0.75 (determined from a solution of 0.4 grams of the polymer in 100 ml. of 97 percent $H_2SO_4$ at 25° C.).

A solution of lithium stearate and the 2,2'-m-phenylene-5,5'-bibenzimidazole was formed in a one gallon stainless steel lined Parr reactor. More specifically, 11.4 grams of lithium stearate were dissolved in 570.0 grams of N,N-dimethylacetamide solvent when added to the solvent with agitation. The lithium stearate was commercially available from Phaltz and Bauer and was believed to be 100 percent pure. The lithium stearate was accordingly present in the resulting solution in a concentration of 2 percent by weight based upon the weight of the N,N-dimethylacetamide solvent. 180.0 grams of the 2,2'-m-phenylene-5,5'-bibenzimidazole were next dissolved in the solution of N,N-dimethylacetamide and lithium stearate by adding the polymer, purging the sealed vessel with nitrogen, and heating to approximately 220° C. The 2,2'-m-phenylene-5,5'-bibenzimidazole was accordingly present in the solution in a concentration of approximately 23.6 percent by weight based upon the total weight of the solution. No stress cracking of the stainless steel lining of the Parr reactor was observed.

Samples of the resulting solution were placed in test tubes. One sample was maintained at room temperature (i.e. approximately 20° C.) and the other sample was maintained at 100° C. The samples were periodically observed for the possible presence of polarized particles using optical microscopy. The observation of any polarized particles was considered to be the onset of the phase out of the polymer. It was found that approximately twenty-two weeks elapsed before any polarized particles were observed in the solutions of the present invention.

On the contrary control solutions which lacked the lithium stearate additive exhibited polarized particles much sooner. More specifically, the room temperature sample (i.e. approximately 20° C.) exhibited polarized particles after 1 week and the 100° C. sample after two weeks.

EXAMPLE II

Example I is substantially repeated with the exception that less pure lithium stearate from a different source was utilized. This sample was available from Eastman and was approximately 75 percent pure. 22.8 grams of the impure lithium stearate were dissolved in 570.0 grams of N,N-dimethylacetamide. Accordingly, the lithium stearate was present in the resulting solution in a concentration of approximately 3 percent by weight. The 2,2'-m-phenylene-5,5'-bibenzimidazole was provided in the same concentration as Example I.

Substantially identical results were achieved as in Example I.

EXAMPLE III

Example I is substantially repeated with the exception that lithium acetate is substituted for the lithium stearate.

EXAMPLE IV

Example I is substantially repeated with the exception that lithium lauryl sulfonate is substituted for the lithium stearate.

EXAMPLE V

Example I is substantially repeated with the exception that lithium cetyl sulfate is substituted for the lithium stearate.

Although the invention has been described with preferred embodiments, it is to be understood that variations and modifications may be employed as will be apparent to those skilled in the art. Such variations and modifications are to be considered within the scope of the claims appended hereto.

We claim:
1. A stable non-corrosive solution suitable for the formation of shaped polybenzimidazole articles comprising:
  (a) a solvent capable of dissolving the polybenzimidazole which is selected from the group consisting of N,N-dimethylacetamide, N,N-dimethylformamide, dimethylsulfoxide, and N-methyl-2-pyrrolidone,
  (b) a polybenzimidazole dissolved in the solvent, and
  (c) a minor amount of an organo-lithium compound dissolved in the solvent which is non-corrosive and is capable of inhibiting the separation of the solution into phases of greater and lesser concentrations of the polybenzimidazole upon the passage of time with said organo-lithium compound being selected from the group consisting of $RCO_2Li$, $RSO_3Li$, $ROSO_3Li$, and mixtures of any two or all three of the foregoing, wherein R is a hydrocarbon radical having 1 to 50 carbon atoms.

2. A stable non-corrosive solution suitable for the formation of shaped polybenzimidazole articles according to claim 1 wherein said solvent (a) is N,N-dimethylacetamide.

3. A stable non-corrosive solution suitable for the formation of shaped polybenzimidazole articles according to claim 1 wherein said polybenzimidazole (b) consists essentially of recurring units selected from the group consisting of
  (I) a unit of the formula

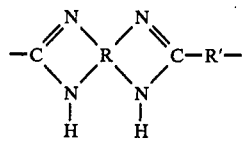

wherein R is a tetravalent aromatic nucleus, with the nitrogen atoms forming the benzimidazole rings being paired upon adjacent carbon atoms of said aromatic nucleus, and R' is selected from the group consisting of (1) an aromatic ring, (2) an alkylene group, (3) a cycloaliphatic ring, and (4) a heterocyclic ring selected from the group consisting of (a) pyridine, (b) pyrazine, (c) furan, (d) quinoline, (e) thiophene, and (f) pyran; and
  (II) a unit of the formula:

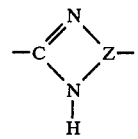

wherein Z is an aromatic ring having the nitrogen atoms forming the benzimidazole ring paired upon adjacent carbon atoms of the aromatic ring.

4. A stable non-corrosive solution suitable for the formation of shaped polybenzimidazole articles according to claim 1 wherein said polybenzimidazole (b) is an aromatic polybenzimidazole.

5. A stable non-corrosive solution suitable for the formation of shaped polybenzimidazole articles according to claim 1 wherein said polybenzimidazole (b) is poly-2,2'-m-phenylene-5,5'-bibenzimidazole.

6. A stable non-corrosive solution suitable for the formation of shaped polybenzimidazole articles according to claim 1 wherein polybenzimidazole (b) is dissolved in said solvent (a) in a concentration of approximately 10 to 30 percent by weight based upon the total weight of said solution.

7. A stable non-corrosive solution suitable for the formation of shaped polybenzimidazole articles according to claim 1 wherein said organo-lithium compound (c) is dissolved in said solvent in a concentration of approximately 0.5 to 10 percent by weight based upon the weight of said solvent.

8. A stable non-corrosive solution suitable for the formation of shaped polybenzimidazole articles which comprises:
  (a) a solvent capable of dissolving the polybenzimidazole which is selected from the group consisting of N,N-dimethylacetamide, N,N-dimethylformamide, dimethylsulfoxide, and N-methyl-2-pyrrolidone,
  (b) a polybenzimidazole dissolved in said solvent, and
  (c) a minor amount of lithium stearate dissolved in said solvent which is non-corrosive and is capable of inhibiting the separation of said solution into phases of greater and lesser concentrations of said polybenzimidazole upon the passage of time.

9. A stable non-corrosive solution suitable for the formation of shaped polybenzimidazole articles according to claim 8 wherein said solvent (a) is N,N-dimethylacetamide.

10. A stable non-corrosive solution suitable for the formation of shaped polybenzimidazole articles according to claim 8 wherein said polybenzimidazole (b) consists essentially of recurring units selected from the group consisting of (I) a unit of the formula

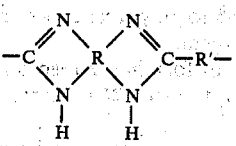

wherein R is a tetravalent aromatic nucleus, with the nitrogen atoms forming the benzimidazole rings being paired upon adjacent carbon atoms of said aromatic nucleus, and R' is selected from the group consisting of (1) an aromatic ring, (2) an alkylene group, (3) a cycloaliphatic ring, and (4) a heterocyclic ring selected from the group consisting of (a) pyridine, (b) pyrazine, (c) furan, (d) quinoline, (e) thiophene, and (f) pyran; and (II) a unit of the formula:

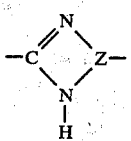

wherein Z is an aromatic ring having the nitrogen atoms forming the benzimidazole ring paired upon adjacent carbon atoms of the aromatic ring.

11. A stable non-corrosive solution suitable for the formation of shaped polybenzimidazole articles according to claim 8 wherein said polybenzimidazole (b) is an aromatic polybenzimidazole.

12. A stable non-corrosive solution suitable for the formation of shaped polybenzimidazole articles according to claim 8 wherein said polybenzimidazole (b) is poly-2,2'-m-phenylene-5,5'-bibenzimidazole.

13. A stable non-corrosive solution suitable for the formation of shaped polybenzimidazole articles according to claim 8 wherein polybenzimidazole (b) is dissolved in said solvent (a) in a concentration of approximately 10 to 30 percent by weight based upon the total weight of said solution.

14. A stable non-corrosive solution suitable for the formation of shaped polybenzimidazole articles according to claim 8 wherein said lithium stearate (c) is dissolved in said solvent in a concentration of approximately 0.5 to 10 percent by weight based upon the weight of said solvent.

15. A stable non-corrosive solution suitable for the formation of shaped polybenzimidazole articles which comprises:

(a) a N,N-dimethylacetamide solvent, (b) approximately 10 to 30 percent by weight based upon the total weight of said solution of a polybenzimidazole dissolved in said solvent consisting of recurring units selected from the group consisting of (I) a unit of the formula

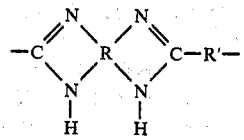

wherein R is a tetravalent aromatic nucleus, with the nitrogen atoms forming the benzimidazole rings being paired upon adjacent carbon atoms of said aromatic nucleus, and R' is selected from the group consisting of (1) an aromatic ring, (2) an alkylene group, (3) a cycloaliphatic ring, and (4) a heterocyclic ring selected from the group consisting of (a) pyridine, (b) pyrazine, (c) furan, (d) quinoline, (e) thiophene, and (f) pyran; and (II) a unit of the formula

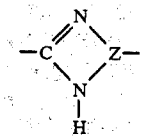

wherein Z is an aromatic ring having the nitrogen atoms forming the benzimidazole ring paired upon adjacent carbon atoms of the aromatic ring; and (c) approximately 0.5 to 10 percent by weight of lithium stearate dissolved in said N,N-dimethylacetamide based upon the weight of said N,N-dimethylacetamide which is non-corrosive and is capable of inhibiting the separation of said solution into phases of greater and lesser concentrations of said polybenzimidazole.

16. A stable non-corrosive solution suitable for the formation of shaped polybenzimidazole articles according to claim 15 wherein said polybenzimidazole (b) is an aromatic polybenzimidazole.

17. A stable non-corrosive solution suitable for the formation of shaped polybenzimidazole articles according to claim 15 wherein said polybenzimidazole (b) is poly-2,2'-m-phenylene-5,5'-bibenzimidazole.

18. A stable non-corrosive solution suitable for the formation of shaped polybenzimidazole articles according to claim 15 wherein said polybenzimidazole (b) is provided in said solution in a concentration of approximately 20 to 26 percent by weight based upon the total weight of said solution.

19. A stable non-corrosive solution suitable for the formation of shaped polybenzimidazole articles according to claim 15 wherein said lithium stearate (c) is dissolved in said N,N-dimethylacetamide in a concentration of approximately 2 to 5 percent by weight based upon the weight of said N,N-dimethylacetamide.

20. A stable non-corrosive solution suitable for the formation of shaped polybenzimidazole articles which comprises:

(a) a N,N-dimethylacetamide solvent, (b) approximately 20 to 26 percent by weight of poly-2,2'-m-phenylene-5,5'-bibenzimidazole dissolved in said N,N-dimethylacetamide based upon the total weight of said solution, and (c) approximately 2 to 5 percent of lithium stearate dissolved in said N,N-dimethylacetamide based upon the weight of said N,N-dimethylacetamide which is non-corrosive and capable of inhibiting the separation of said solution into phases of greater and lesser concentrations of said poly-2,2'-m-phenylene-5,5'-bibenzimidazole.

21. A stable non-corrosive solution suitable for the formation of shaped polybenzimidazole articles wherein approximately 24 percent by weight of poly-2,2'-m-phenylene-5,5'-bibenzimidazole is dissolved in said N,N-dimethylacetamide based upon the total weight of the solution, and approximately 2 percent by weight of lithium stearate is dissolved in said solution based upon the weight of N,N-dimethylacetamide.

22. A process for forming shaped polybenzimidazole articles comprising:
   (a) dissolving a polybenzimidazole and a minor amount of an organo-lithium compound selected from the group consisting of $RCO_2Li$, $RSO_3Li$, $ROSO_3Li$, and mixtures of any two or all three of the foregoing wherein R is a hydrocarbon radical having 1 to 50 carbon atoms, in a solvent selected from the group consisting of N,N-dimethylacetamide, N,N-dimethylformamide, dimethylsulfoxide, and N-methyl-2-pyrrolidone,
   (b) storing the resulting solution in contact with stainless steel for a period of at least one day without the occurrence of substantial phase separation in the same or corrosive damage to the stainless steel, and
   (c) extruding the solution through an opening to form a shaped article.

23. A process for forming shaped polybenzimidazole articles according to claim 22 wherein said shaped article is a filament.

24. A process for forming shaped polybenzimidazole articles according to claim 22 wherein said solution is stored for at least three days prior to extrusion.

25. A process for forming shaped polybenzimidazole articles according to claim 22 wherein said solution is extruded into an evaporative atmosphere for the solvent to form said shaped article.

26. A process for forming shaped polybenzimidazole articles comprising (a) dissolving a polybenzimidazole and a minor amount of lithium stearate in a solvent selected for the group consisting of N,N-dimethylacetamide, N,N-dimethylformamide, dimethylsulfoxide, and N-methyl-2-pyrrolidone, (b) storing the resulting solution in a stainless steel vessel for a period of at least one day without the occurrence of substantial phase separation in the same or corrosive damage to the stainless steel, and (c) extruding the solution through an opening to form a shaped article.

27. A process for forming polybenzimidazole articles according to claim 26 wherein said polybenzimidazole is poly-2,2'-m-phenylene-5,5'-bibenzimidazole.

28. A process for forming shaped polybenzimidazole articles according to claim 26 wherein said solvent is N,N-dimethylacetamide.

29. A process for forming shaped polybenzimidazole articles according to claim 26 wherein said polybenzimidazole is dissolved in said solvent in a concentration of approximately 20 to 25 percent by weight based upon the total weight of the solution.

30. A process for forming shaped polybenzimidazole articles according to claim 26 wherein said lithium stearate is dissolved in said solvent in a concentration of approximately 0.5 to 10 percent by weight based upon the weight of solvent.

31. A process for forming shaped polybenzimidazole articles according to claim 26 wherein said shaped article is a filament.

32. A process for forming shaped polybenzimidazole articles according to claim 26 wherein said solution is stored for at least three days prior to extrusion.

33. A process for forming shaped polybenzimidazole articles according to claim 26 wherein said solution is extruded into an evaporative atmosphere for the solvent to form said shaped article.

34. A process for forming shaped polybenzimidazole articles comprising (a) dissolving poly-2,2'-m-phenylene-5,5'-bibenzimidazole and lithium stearate in N,N-dimethylacetamide with said poly-2,2'-m-phenylene-5,5'-bibenzimidazole being present in a concentration of approximately 20 to 26 percent by weight based upon the total weight of the solution and said lithium stearate being present in a concentration of approximately 2 to 5 percent by weight based upon the weight of N,N-dimethylacetamide, (b) storing the resulting solution in a stainless steel vessel at least one day with the occurrence of no substantial phase separation in the same or corrosive damage to the stainless steel, and (c) extruding the solution through an opening to form a shaped article.

35. A process for forming shaped polybenzimidazole articles according to claim 34 wherein said poly-2,2'-m-phenylene-5,5'-bibenzimidazole is present in said solution in a concentration of approximately 24 percent by weight based upon the total weight of the solution and said lithium stearate is present in said solution in a concentration of approximately 2 percent by weight based upon the weight of N,N-dimethylacetamide.

36. A process for forming shaped polybenzimidazole articles according to claim 34 wherein said shaped article is a filament.

37. A process for forming shaped polybenzimidazole articles according to claim 34 wherein said solution is stored for at least three days prior to extrusion.

38. A process for forming shaped polybenzimidazole articles according to claim 34 wherein said solution is extruded into an evaporative atmosphere for said N,N-dimethylacetamide to form said shaped article.

* * * * *